(12) United States Patent
Dworzan

(10) Patent No.: US 7,437,961 B2
(45) Date of Patent: Oct. 21, 2008

(54) GYRO POWER STARTER

(75) Inventor: Bill Dworzan, Santa Ana, CA (US)

(73) Assignee: Dynaflex International, Anaheim, CA (US)

( * ) Notice: Subject to any disclaimer, the term of this patent is extended or adjusted under 35 U.S.C. 154(b) by 259 days.

(21) Appl. No.: 11/435,833

(22) Filed: May 16, 2006

(65) Prior Publication Data

US 2007/0266805 A1 Nov. 22, 2007

(51) Int. Cl.
*G01C 19/30* (2006.01)
*G01C 19/06* (2006.01)

(52) U.S. Cl. .............................. 74/5.47; 74/5.45; 74/5.7

(58) Field of Classification Search ................... 74/5.22, 74/5.12, 5.4, 5.41, 5.45, 5.47, 5.7; 482/44, 482/45, 110; 446/233; D21/461
See application file for complete search history.

(56) References Cited

U.S. PATENT DOCUMENTS

| | | | |
|---|---|---|---|
| 698,286 A | * | 4/1902 | Irving ......................... 446/235 |
| 3,019,555 A | * | 2/1962 | Poticha ......................... 446/37 |
| 3,726,146 A | * | 4/1973 | Mishler ......................... 74/5 R |
| 6,053,846 A | * | 4/2000 | Lin ................................ 482/44 |
| D457,922 S | * | 5/2002 | Christianson ............... D21/461 |
| 6,458,008 B1 | * | 10/2002 | Hyneman .................... 446/259 |
| 6,913,506 B2 | * | 7/2005 | Tiefel et al. .................. 446/236 |
| 7,033,304 B2 | * | 4/2006 | Chuang et al. ................ 482/45 |
| 7,102,258 B2 | * | 9/2006 | Shen ............................ 310/50 |

* cited by examiner

*Primary Examiner*—Roger Pang
(74) *Attorney, Agent, or Firm*—Clement Cheng

(57) ABSTRACT

A power starting dock for gyroscope is comprised of an outer housing that has a bottom and a concave head. The head is slanted at an angle relative to the housing, and engages a gyroscope rotor, an electric power source on the housing, a spring-mounted motor on the housing connected to the power source for producing a rotational power in response to a switching force, and a power rotor fastened to the motor and protruding into the concave head of the housing. The power rotor serves to resiliently transmit rotational motor power to the gyroscope rotor.

17 Claims, 3 Drawing Sheets

GYRO POWER STARTER

BACKGROUND OF THE INVENTION

A. Field of the Invention

Technology proposed in the following utility patent relates to a new type of gyroscopic accessory. More particularly, the present invention is a portable starter dock that enables an automatic spin start for gyroscopes.

B. Description of the Prior Art

Gyroscopes have a myriad of diverse purposes, ranging from recreational spinning tops and yoyos to the essential balancing component within motorcycles. The gyroscopic resistance against directional changes of spin axis can be translated into a resistance useful for muscular exercises. As a result, an array of arm and hand exercise equipment has been developed using such scientific principles.

A fundamental gyroscopic wrist exerciser originally appeared within U.S. Pat. No. 3,726,146 issued to Archie Mishler, the disclosure of which is incorporated herein by reference. Silkebakken illustrates subsequent modifications to the original design in U.S. Pat. No. http://patft1.uspto.gov/netacgi/-h0http://patft1.uspto.gov/netacgi/-h2 24,150,580, and Frederick Mishler follows suit in U.S. Pat. No. 5,150,625; both of which are also incorporated herein by reference. Upon initial usage, those with minimal hand strength have trouble starting the gyroscopic wrist exercisers, and unfortunately, this is the category of people with the greatest potential to benefit from the device.

Early gyroscopic wrist exercisers were started by a pull string wound around the gyro rotor. Eventually, an electric hand-starter was incorporated into the apparatus, creating an initial spinning momentum from which the user could take control during workout. The starter is a hand-held electric tool that can rotationally push a gyro rotor within the outer casing of the hand exerciser, which is held in the air by the opposing hand.

Even with the assistance of the electric tool, dexterous handling is still necessary to constantly obtain a desired spinning speed of the gyro rotor. In order to effectively use the device, the tool head must be pushed against the gyro rotor surface at the correct angle and with a specific force. All portable automatic gyro starters currently on the market lack a means to start the gyro rotor without special maneuvering. Because gyroscopic exercisers are becoming increasingly popular within the field of medical rehabilitation, the demand for a simple and reliable means for starting the device is ever increasing. Patients need a device that will compensate for their diminished strength, as well as their hand muscles that are incapable of performing the special maneuvering required by current apparatuses.

SUMMARY OF THE INVENTION

With respect to the previously mentioned problems, it is an object of the present invention to provide an improved portable gyros power dock that automatically starts gyroscopes. The current invention also includes a convenient docking station for the gyroscope to casually enter and exit.

The gyroscope power starter is comprised of an outer housing which has a bottom and a concave head. The head is slanted at an angle relative to the housing, and engages a gyroscope rotor, an electric power source on the housing, a spring-mounted motor on the housing connected to the power source for producing a rotational power in response to a switching force, and a power rotor fastened to the motor and protruding into the concave head of the housing. The power rotor serves to resiliently transmit rotational motor power to the gyroscope rotor.

The power starter also has a pushbutton switch that initiates a circuit among the power source, motor and rotor. This is accomplished by activation of the switching force and breaking the circuit as the switching force is released.

The housing of the power starter may be contoured as a desktop pedestal or into a dock-shaped truncated hexagonal pyramid, and the pushbutton switch may be annexed to a rear side of the housing. The housing can also be contoured into a handheld starter, and the entire power starter can be created to be as light as the gyroscope.

According to the present invention, the power dock can consist of a light, yet sturdy, plastic material. It can be placed on any surface, including a desktop, or held by a user during operation. The gyroscope is typically an exerciser type with a gyro rotor, although the present invention is easily adaptable to different kinds of portable gyroscope products.

The power dock has a top face that is slanted forward into an acute angle, typically thirty-nine degrees relative to the bottom. This particular configuration keeps fifty percent of gyro rotor axle weight on the upper body of the power dock, controlling "cam out" or precession. The present anti-cam out drive is unique because it simultaneously supports and drives the gyroscope automatically, without generating an undesirable precession jolt. The top face is defined as six outer side edges and a central basin area. The basin area has a large annular edge on which the gyroscope rests. The annular edge extends at a downwardly converging angle to a lower surface by an annular wall. The lower surface lies parallel to the top face.

The basin is adapted to receive the gyroscope, creating a driving engagement with the power dock. To provide a unique supportive drive force to the gyroscope, a spring-mounted electric powered rotor protrudes at the basin area through an elongated opening in the lower surface. The elongated opening can be superimposed upon the concave center of the lower surface, in correspondence to the general spherical surface wherein the gyroscope is seated.

At the rear sidewall, an upright mount protrudes from the bottom and functions to support the start button. The electrical pushbutton switch completes the circuit only upon depression and immediately breaks the circuit as the switch is released. This eliminates the need for the user to generate any additional motions to start the gyroscope while on the power dock. The rear sidewall bears a cutout for the mount to pass through. Two latches located in the frontal area of the bottom protrude upward, and corresponding holes are formed in the upper shell. This allows the bottom to first lock into the shell at the front. The components are additionally fastened at the rear by a screw, which is threaded through the rear sidewall and an upright open slot. For ease of battery replacement, the interior of the power dock can be exposed by simply unscrewing and pulling the shell upward.

A leaf spring is cantilevered to the bottom of the apparatus by a post integral and primarily functions to suspend a motor. The motor is clipped at opposite ends by the two side plates of the leaf spring, which are bent at an upward angle. The rotating axis of the motor is fixed to the center bore of the power rotor. The leaf spring works to maintain the motor/rotor assembly at a neutral position in the interior of the upper shell, with a circumferential section of the apparatus always forced towards the upper front of the power dock. Batteries are mounted on the board to power the motor/rotor. Instead of installing start button, simple electrical terminals can be arranged under the leaf-spring inside of the power dock to make or break the power circuit. This particular assembly option capitalizes on the weight or depression of the gyroscope.

Embodiments of the invention will now be described by means of example with reference to the accompanying drawings.

BRIEF DESCRIPTION OF THE DRAWINGS

Similar reference numbers denote corresponding features throughout the attached drawings.

DETAILED DESCRIPTION OF THE PREFERRED EMBODIMENT

Figure 1:
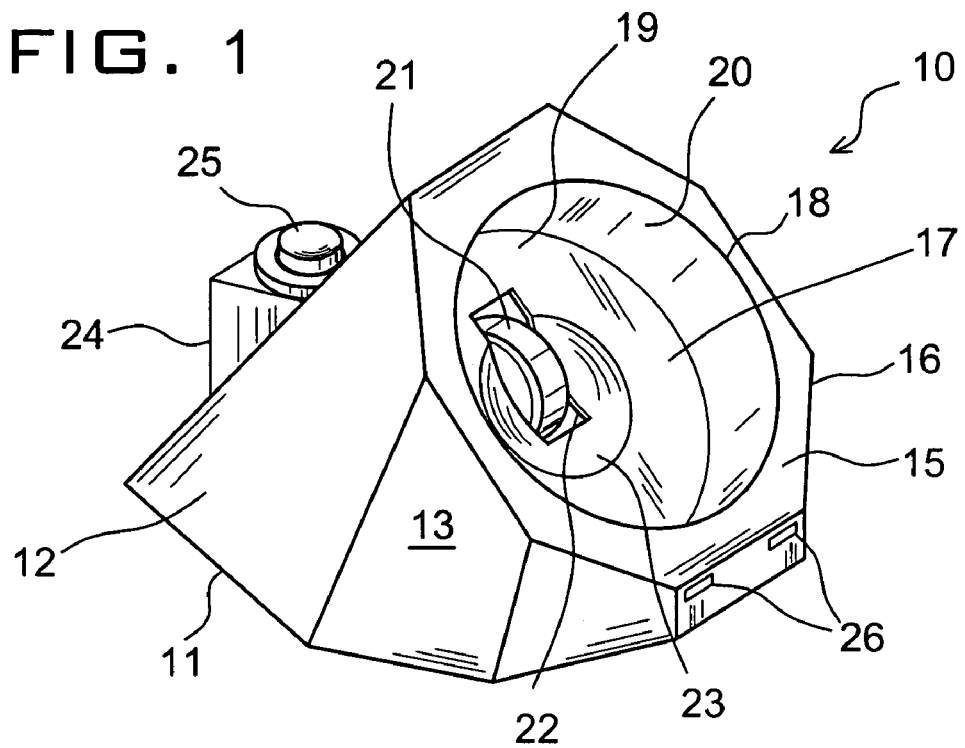
FIG. 1 is a perspective view of a gyro power dock according to the present invention.
Figure 2:
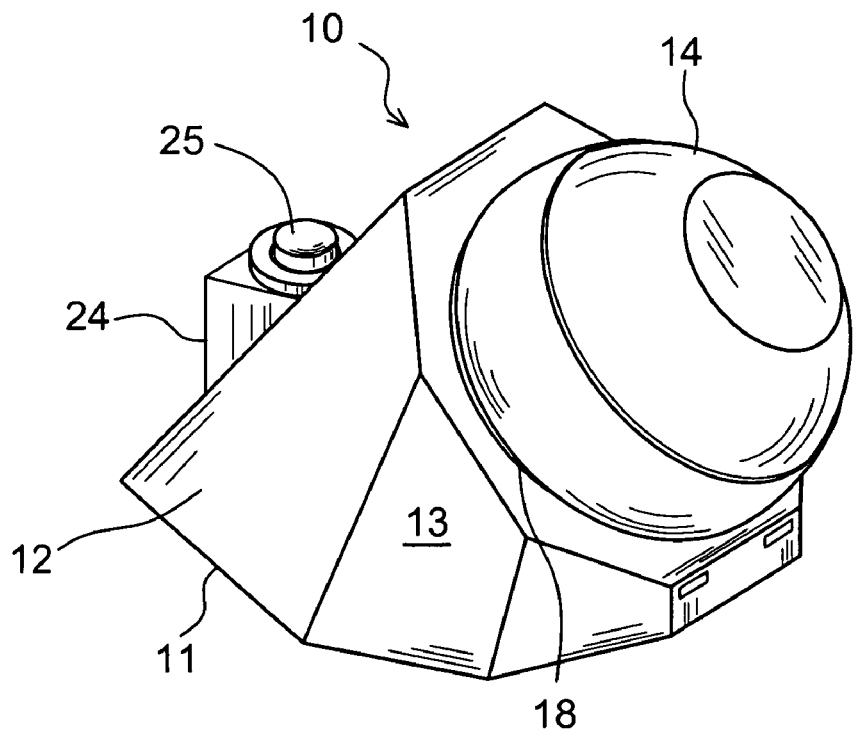
FIG. 2 is a perspective view of the gyro power dock of FIG. 1 while in operation, showing an exemplary gyro hand exerciser loaded to start an internal rotor.

In reference to FIGS. 1 and 2, a power dock 10 resembles a truncated hexagonal pyramid with a flat bottom 11, an upper shell 12, and slanted sidewalls 13. The dock 10 can be placed on any surface, including and not limited to a desktop. A user may also prefer to hold the device; the invention is easily made portable due to its minimal weight, which can be as little as the accompanying gyroscope 14. The gyroscope 14 shown depicts the exercise type and has a gyro rotor R, although the present invention is easily adaptable to various types of portable gyroscope products.

Figure 3:
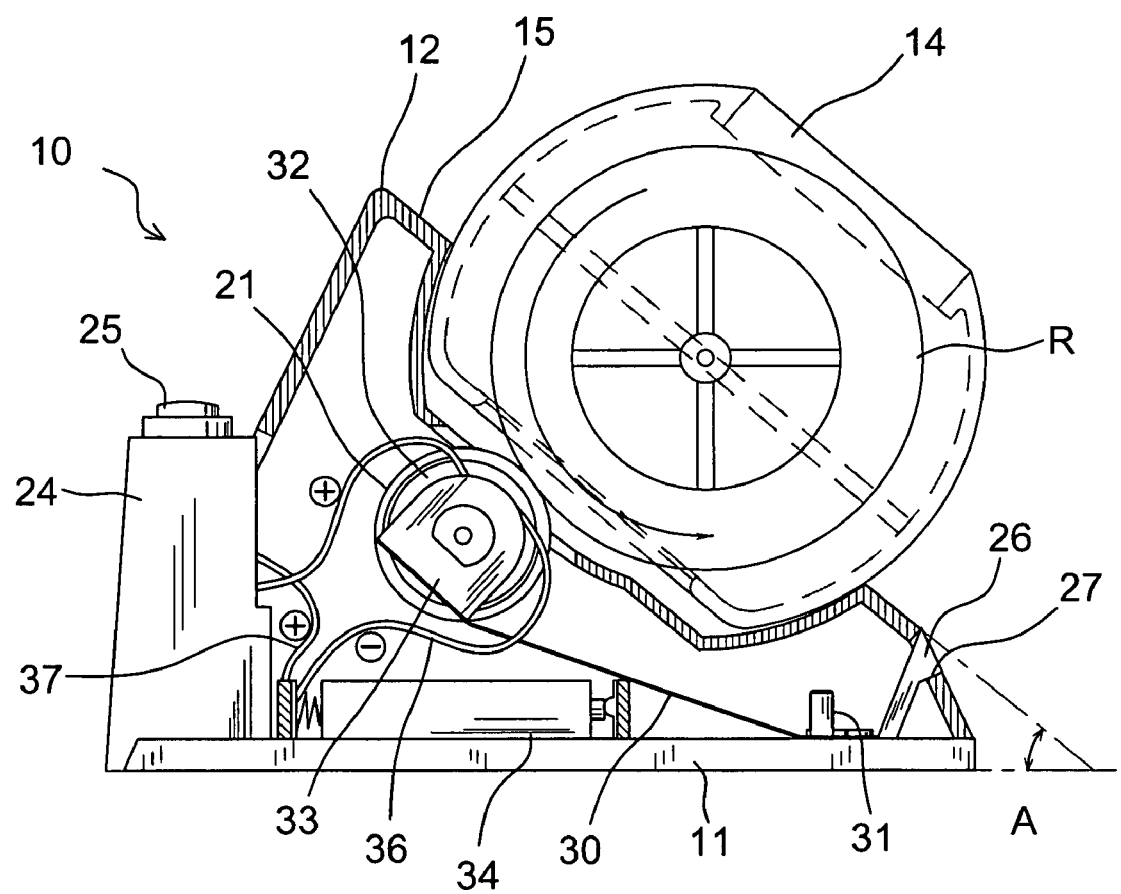
FIG. 3 is a partially exploded side view of the gyro power dock of FIG. 1, which reveals a cantilevered driving rotor in contact with the gyro rotor.

The dock 10 has a top face 15 slanted forward creating the acute angle A, preferably measuring thirty-nine degrees relative to the flat bottom 11, as shown in FIG. 3. This angle is significant in the present invention because it functions to simultaneously support and drive the gyroscope 13 automatically.

Six outer side edges 16 and a central basin area 17 define the top face 15. The basin area 17 has a large annular edge 18 on which the gyroscope 14 rests. The annular edge 18 extends to a lower stepped surface 19 by an annular wall 20 at a downward converging angle. The lower surface 19 lies parallel to the top face 15.

The power dock 10 may take different shapes, including a three-sided pyramid, a truncated circular cone, or an irregular form. The possibilities are virtually limitless, as long as the power dock provides an anti-cam-out drive for the gyroscope 14 as described in detail below.

The basin 17 is adapted to receive the gyroscope 14 so that it makes a driving engagement with the power dock 10. To provide a unique supportive driving force to the gyroscope 14, an electrically powered rotor 21 is spring-mounted and protrudes at the basin area 17 through an elongated opening 22 formed in the lower surface 19. The rotor 21 may be rubberized over its circumferential areas to provide a good frictional contact with the gyro rotor R.

The lower surface 19 has a concave center area 23, which may superimpose the elongated opening 22 corresponding to the general spherical surface of the gyroscope 13 to be seated.

At the rear sidewall 13, an upright mount 24 that protrudes from the bottom 11 supports a starting button 25. The electrical pushbutton switch only completes the circuit only upon depression and immediately breaks the circuit as the switch is released. This eliminates the need for the user to generate any additional motions to start the gyroscope 14 while on the power dock 10.

Figure 4:
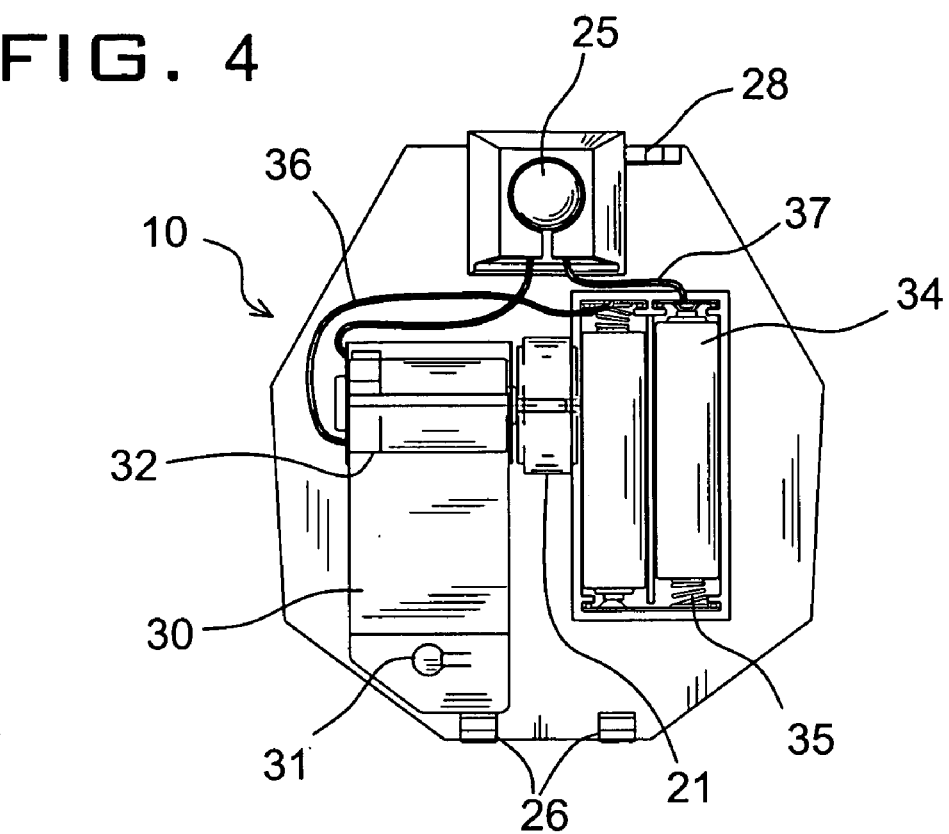
FIG. 4 is a plan view of the driving mechanism of the gyro power dock of FIG. 1 with its top shell removed.

The rear sidewall 12 bears a cutout for the mount 24 to pass through. Two latches 26 located in the frontal area of the bottom 11 protrude upward, and corresponding holes 27 are formed in the upper shell 12. This allows the bottom 11 to first lock into the shell 12 at the front. The components are additionally fastened at the rear by a screw, which is threaded through the rear sidewall 13 and an upright open slot 28 shown in FIG. 4. For ease of battery replacement, the interior of the power dock can be exposed by simply unscrewing and pulling the shell 12 upward from the bottom 11.

A leaf spring 30 is cantilevered by a post 31 integral to the bottom 11 and suspends a motor 32, which is clipped at its opposite ends by two upwardly bent side plates 33 of the leaf spring 30. In addition, the rotating axis of the motor 32 is fixed to a center bore of the power rotor 21. The spring 30 normally keeps the motor/rotor assembly at a neutral position in the interior of the upper shell 12, with a circumferential section of the power rotor 21 always forced towards the upper front of the power dock 10.

In this embodiment, batteries 34 of three volts are mounted on board to power the motor 32 and the rotor 21, although different rates of motors and power sources may be used as well. A four-sided open compartment 35 holds the batteries 34 under spring 35 biases. The batteries 34 supply the electric power through two wires. One polarity of wire 36 directly connects to one power terminal of the motor 32, and the other polarity of wire 37 is connected through the switch 25 to the other power terminal of the motor 32 in series. It would be possible to operate using a rechargeable battery, which can be connected to a household outlet through an appropriate adaptor.

The installation of the starting button 25 is arbitrary. If desired, the starting button 25 may be replaced by simple electrical terminals arranged under the leaf spring 30 to make or break the power circuit. This particular assembly option capitalizes on the weight or depression of the gyroscope 14.

Figure 5:
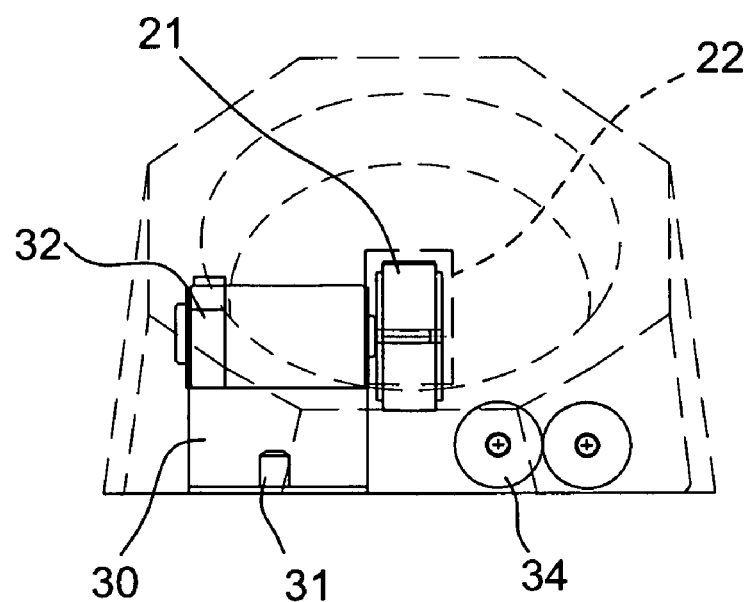
FIG. 5 is a front view of the gyro power dock of FIG. 1 showing the positional level of the driving rotor inside the power dock.

FIG. 5 illustrates the positional relation of the power rotor 21 to the surrounding components from a frontal perspective. During operation, power dock 10 is laid on a considerably level surface, as shown in FIG. 3.

The power dock 10 receives the gyroscope 14 in the angled basin area 17 with the gyro rotor R oriented in the same rotational direction as the power rotor 21. This configuration ensures that the spring mounted motor 32 keeps the gyro rotor R from bouncing, thus causing a "cam out" as the start button 25 is pushed. The angled surface 19 of the basin area 17 keeps exactly half of the axle weight of the gyro rotor R on the annular wall 20 of the basin area 17 to control "cam out".

Therefore, the angled basin area 17, leaf spring 26, motor 32 and rotor 21 collectively form a docking base to consistently start the gyroscope 14.

When creating the initial momentum for gyroscope hand/arm exercisers, the power dock 10 may only be used to start the gyro rotor until it reaches a threshold speed. The user must then take over the momentum of the exerciser by applying his/her strength to keep the gyro rotor moving. The upper shell 12 of the invention can be customized to fit a different gyroscope for educational or entertainment purposes. In this case, the power dock 10 may be used repeatedly as needed when the rotator loses inertia.

The motor is flexibly mounted to account for the fact that some gyro rotors are not very concentric with the axle. A rigidly mounted motor may cause the gyro to bounce, lose its seating, and then precess while spinning at the starting RPM. Initial speed can range from one to fifteen rotations per minute (RPM). The spring of the mounted drive should be tuned to allow the motor and drive assembly to drive the off-center rotor. The power starter has the ability to function with numerous versions of gyros, both new and old, and each with different measurements for the rotor protrusion beyond the gyro housing. The motor height is adjustable in order to allow each gyro to sit flat in the recess cup.

The motor height is user adjustable. An optional setscrew abuts the leaf spring, thus limiting its inherent range of motion. This spring limiting member can be a high adjustable machine screw, or a rigid member that is either mounted or integrally formed with the housing of the product. The spring limiting member is typically formed integrally when the spring has a narrow range or heights. This would occur in the event wherein the device is designed to operate with a specific gyroscope model. A wide variety of calibration and adjustment options are common in art illustrating the limitation of spring member travel.

While the presently preferred form of the gyroscope power dock has been shown and described, and several modifications thereof discussed, persons skilled in this art will readily appreciate that various additional changes and modifications may be made without departing from the spirit of the invention, as defined and differentiated by the following claims.

CALL OUT LIST OF ELEMENTS

10: Gyro Power Dock
11: Flat Bottom
12: Upper Shell
13: Side Wall
14: Gyroscope
15: Top Face
16: Outer Side Edges
17: Basin Area
18: Annular Edge
19: Lower Stepped Surface
20: Annular Wall
21: Power Rotor
22: Elongated Opening
23: Concave Area
24: Mount
25: Starting Button
26: Latch
27: Hole
28: Open Slot
30: Leaf Spring
31: Post
32: Motor
33: Side Plate
34: Battery
35: Spring
36,37: Wire
A: Angle of Top Face
R: Gyro Rotor

The invention claimed is:

1. A gyroscope power starter comprising:
a housing having a bottom and a concave head slanted at a predetermined angle relative to the housing, the concave head engaging a gyroscope rotor;
an electric power source on the housing;
a spring-mounted motor on the housing connected to the power source for producing a rotational power in response to a switching force; and
a power rotor connected in unity with the motor and protruding into the concave head of the housing to transmit the rotational motor power resiliently to the gyroscope rotor.

2. The gyroscope power starter of claim 1, wherein the predetermined angle of the slanted concave head is approximately 39° from the housing bottom.

3. The gyroscope power starter of claim 1, wherein the power rotor is rubberized over its circumferential areas to provide a good frictional contact with the gyroscope rotor.

4. The gyroscope power starter of claim 1, further comprising a pushbutton switch for making a circuit among the power source, motor and rotor only under activation of the switching force and breaking the circuit as soon as the switching force is released.

5. The gyroscope power starter of claim 1, wherein the housing is contoured as a desktop pedestal.

6. The gyroscope power starter of claim 5, wherein the housing is shaped into a truncated hexagonal pyramid and the pushbutton switch is annexed to a rear side of the housing.

7. The gyroscope power starter of claim 1, wherein the housing is contoured into a handheld starter.

8. The gyroscope power starter of claim 1, further comprising proximal contacts under the spring-mounted motor, against which the switching force being provided by a depression of the gyroscope itself to connect the proximal contacts.

9. A gyroscope power starter comprising:
a housing having a concave depression, the concave depression shaped to hold a gyroscope rotor;
an electric power source connected to the housing;
a motor mounted on the housing and connected to the electric power source, the motor producing rotational motor power in an active state and deactivated in a deactivated state and;
a power rotor connected to the motor transmitting rotational motor power to a gyroscope rotor sitting in the concave depression when the motor is activated in active state so that a gyroscope rotor placed within the concave depression will receive the power rotor, wherein the concave depression is slanted at an angle of approximately 39° from a housing bottom.

10. A gyroscope power starter comprising:
a housing having a concave depression, the concave depression shaped to hold a gyroscope rotor;
an electric power source connected to the housing;
a motor mounted on the housing and connected to the electric power source, the motor producing rotational motor power in an active state and deactivated in a deactivated state and;
a power rotor connected to the motor transmitting rotational motor power to a gyroscope rotor sitting in the concave depression when the motor is activated in active state so that a gyroscope rotor placed within the concave depression will receive the power rotor, wherein the motor is mounted on the housing via a resilient spring.

11. A gyroscope power starter comprising:
a housing having a concave depression, the concave depression shaped to hold a gyroscope rotor;
an electric power source connected to the housing;
a motor mounted on the housing and connected to the electric power source, the motor producing rotational motor power in an active state and deactivated in a deactivated state and;

a power rotor connected to the motor transmitting rotational motor power to a gyroscope rotor sitting in the concave depression when the motor is activated in active state so that a gyroscope rotor placed within the concave depression will receive the power rotor, wherein the power rotor is rubberized over its circumferential areas to provide a good frictional contact with the gyroscopic power starter.

12. A gyroscopic wrist exerciser starter comprising:

a housing having a gyroscope rotor receiver, the gyroscope rotor receiver shaped to hold a gyroscope rotor;

an electric power source connected to the housing;

a motor mounted on the housing and connected to the electric power source, the motor producing rotational motor power in an active state and deactivated in a deactivated state and;

a power rotor connected to the motor transmitting rotational motor power to the gyroscope rotor receiver when the motor is activated in active state so that a gyroscope rotor placed on the gyroscope rotor receiver will receive the power rotor, wherein the gyroscope rotor receiver is formed as a generally circular concave depression poised at an angle of approximately 39° from a housing bottom.

13. The gyroscopic wrist exerciser starter of claim 12, wherein the resilient spring is a leaf spring.

14. The gyroscopic wrist exerciser starter of claim 12, wherein the power rotor is rubberized over its circumferential areas to provide a good frictional contact with the gyroscopic wrist exerciser.

15. The gyroscopic wrist exerciser starter of claim 12, further comprising a pushbutton switch for making a circuit among the power source, motor and rotor only under activation of the switching force and breaking the circuit as soon as the switching force is released.

16. The gyroscopic wrist exerciser starter of claim 12, wherein the housing is contoured as a desktop pedestal.

17. A gyroscopic wrist exerciser starter comprising:

a housing having a gyroscope rotor receiver, the gyroscope rotor receiver shaped to hold a gyroscope rotor;

an electric power source connected to the housing;

a motor mounted on the housing and connected to the electric power source, the motor producing rotational motor power in an active state and deactivated in a deactivated state and;

a power rotor connected to the motor transmitting rotational motor power to the gyroscope rotor receiver when the motor is activated in active state so that a gyroscope rotor placed on the gyroscope rotor receiver will receive the power rotor, wherein the motor is mounted on the housing via a resilient spring.

* * * * *